US 11,365,907 B2

(12) United States Patent
Umeki et al.

(10) Patent No.: US 11,365,907 B2
(45) Date of Patent: Jun. 21, 2022

(54) REFRIGERATION APPARATUS AND LIQUID TEMPERATURE CONTROL SYSTEM

(71) Applicant: SHINWA CONTROLS CO., LTD, Kawasaki (JP)

(72) Inventors: Masamichi Umeki, Kawasaki (JP); Hideaki Furumoto, Kawasaki (JP); Shigeo Aoki, Kawasaki (JP); Ryo Moriya, Kawasaki (JP); Hirofumi Inoue, Kawasaki (JP)

(73) Assignee: Shinwa Controls Co., Ltd, Kawasaki (JP)

( * ) Notice: Subject to any disclaimer, the term of this patent is extended or adjusted under 35 U.S.C. 154(b) by 0 days.

(21) Appl. No.: 16/961,852

(22) PCT Filed: May 27, 2019

(86) PCT No.: PCT/JP2019/020841
§ 371 (c)(1),
(2) Date: Jul. 13, 2020

(87) PCT Pub. No.: WO2019/230631
PCT Pub. Date: Dec. 5, 2019

(65) Prior Publication Data
US 2020/0355406 A1 Nov. 12, 2020

(30) Foreign Application Priority Data
May 31, 2018 (JP) .............................. JP2018-105223

(51) Int. Cl.
*F25B 6/02* (2006.01)
*F25B 43/00* (2006.01)
*F25B 41/385* (2021.01)

(52) U.S. Cl.
CPC .............. *F25B 6/02* (2013.01); *F25B 43/006* (2013.01); *F25B 41/385* (2021.01); *F25B 2400/23* (2013.01)

(58) Field of Classification Search
CPC ...... F25B 6/00; F25B 6/02; F25B 6/04; F25B 41/30; F25B 41/385; F25B 43/006; F25B 2400/23
See application file for complete search history.

(56) References Cited

U.S. PATENT DOCUMENTS 3,780,535 A * 12/1973 Darredeau ............. F25J 1/0052
62/612
4,141,707 A * 2/1979 Springmann .......... F25J 1/0265
62/615
(Continued)

FOREIGN PATENT DOCUMENTS

CN          205448389 U    8/2016
EP          0 669 505 A2    8/1995
(Continued)

OTHER PUBLICATIONS

English Translation of the International Preliminary Report on Patentability (Chaper I) (Application No. PCT/JP2019/020841) dated Dec. 10, 2020.
(Continued)

*Primary Examiner* — Miguel A Diaz
(74) *Attorney, Agent, or Firm* — Burr & Brown, PLLC

(57) ABSTRACT

A part of a gas-phase mixed refrigerant compressed by a compressor (20) is condensed by a first condenser (21). Then, the mixed refrigerant is separated by a first gas-liquid separator (22) into a gas-phase first fluid portion (I) and a liquid-phase second fluid portion (II) which has been condensed into a liquid phase. A part of the gas-phase first fluid portion (I) is further condensed by a second condenser (23). Then, the first fluid portion is further separated by a second (Continued)

gas-liquid separator (24) into a gas-phase third fluid portion (III) and a liquid-phase fourth fluid portion (IV) which has been condensed into a liquid phase. Thereafter, the gas-phase third fluid portion (III) is condensed and then expanded.

8 Claims, 1 Drawing Sheet

(56) References Cited

U.S. PATENT DOCUMENTS

| | | | | |
|---|---|---|---|---|
| 4,251,247 | A * | 2/1981 | Gauberthier | F25J 1/0022 62/114 |
| 4,303,427 | A * | 12/1981 | Krieger | F25B 1/10 62/335 |
| 4,325,231 | A * | 4/1982 | Krieger | F25B 1/10 62/114 |
| 6,751,984 | B2 * | 6/2004 | Neeraas | F25J 1/0015 62/612 |
| 8,826,677 | B2 * | 9/2014 | Clodic | B01D 53/002 62/115 |
| 10,928,103 | B2 * | 2/2021 | Yamawaki | F25B 7/00 |
| 11,067,315 | B2 * | 7/2021 | Yamawaki | F25B 7/00 |
| 2014/0341710 | A1 * | 11/2014 | Creamer | F04D 27/007 415/111 |
| 2021/0140685 | A1 * | 5/2021 | Yamawaki | F25B 49/02 |

FOREIGN PATENT DOCUMENTS

| | | |
|---|---|---|
| JP | S53-007860 A1 | 1/1978 |
| JP | H08-068567 A1 | 3/1996 |
| JP | H08-285410 A1 | 11/1996 |
| JP | 2001-099498 A1 | 4/2001 |
| JP | 2003-314908 A1 | 11/2003 |
| KR | 2006-0039292 A | 5/2006 |

OTHER PUBLICATIONS

International Search Report and Written Opinion (Application No. PCT/JP2019/020841) dated Jul. 9, 2019.
Chinese Office Action (with English translation), Chinese Application No. 201980035459.6, dated Aug. 18, 2021 (15 pages).
AM Extended European Search Report, European Application No. 19812442.2, dated Jan. 25, 2022 (9 pages).

* cited by examiner

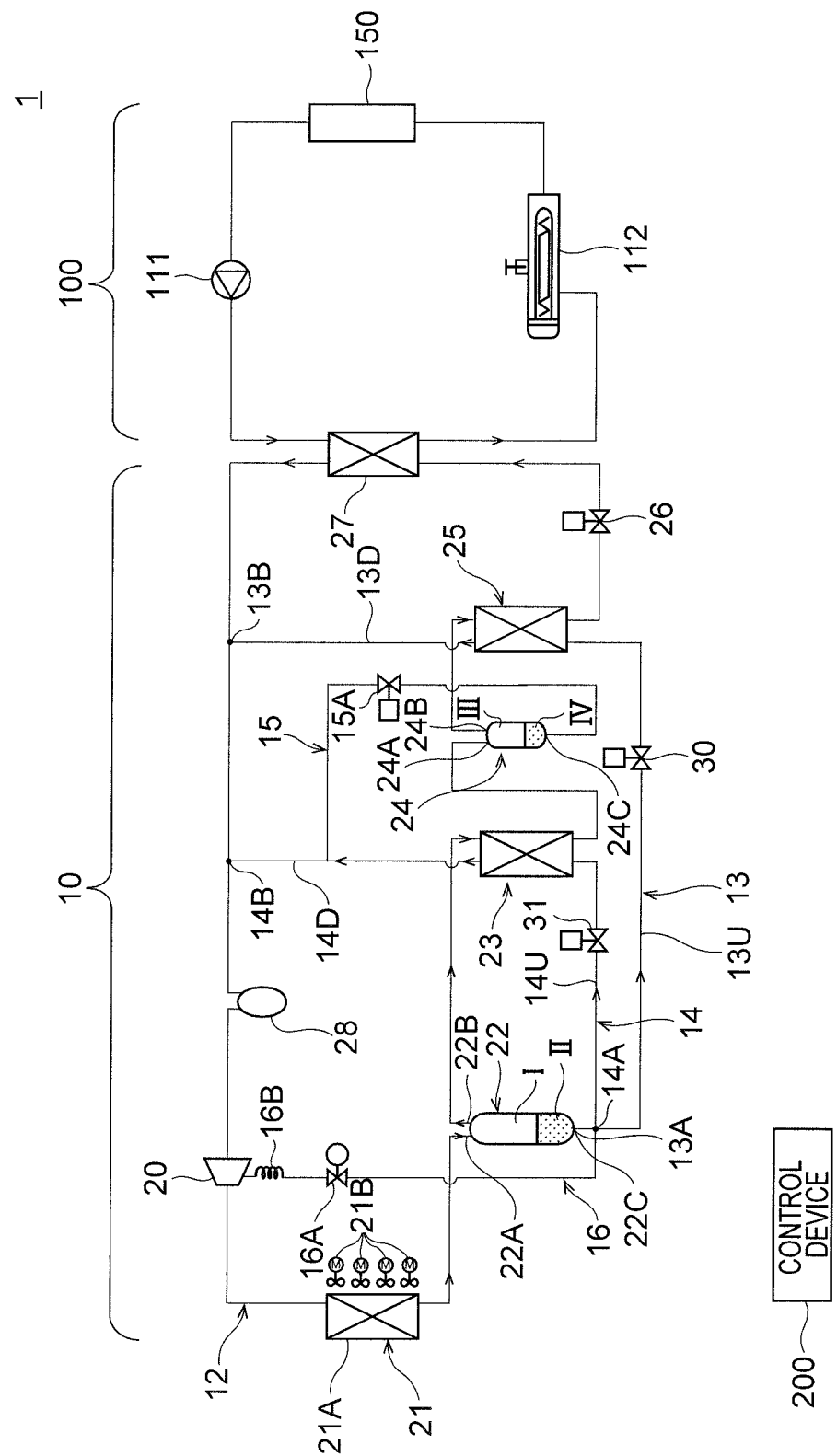

REFRIGERATION APPARATUS AND LIQUID TEMPERATURE CONTROL SYSTEM

FIELD OF THE INVENTION

The present invention relates to: a refrigeration apparatus comprising a compressor, a condenser, an expansion valve and an evaporator; and a liquid temperature control system comprising the refrigeration apparatus.

BACKGROUND ART

When an object whose temperature is to be controlled (temperature control object) is cooled down to an extremely low temperature level such as −50° C., a dual refrigeration apparatus (cascade refrigeration apparatus) is generally used. The dual refrigeration apparatus comprises a high-temperature-side refrigerant circuit and a low-temperature-side refrigerant circuit, wherein an evaporator of the high-temperature-side refrigerant circuit and a condenser of the low-temperature-side refrigerant circuit constitute a cascade condenser by which their respective refrigerants can be heat-exchanged. In the cascade condenser, the low-temperature-side refrigerant compressed in the low-temperature-side refrigerant circuit is condensed by the high-temperature-side refrigerant that is condensed and then expanded in the high-temperature-side refrigerant circuit. Thereafter, by expanding the low-temperature-side refrigerant, the temperature control object can be cooled down to an extremely low temperature level.

In the aforementioned dual refrigeration apparatus, since each of the high-temperature-side refrigerant circuit and the low-temperature-side refrigerant circuit has a compressor, a condenser, an expansion valve and an evaporator, the system as a whole disadvantageously has a large size and a heavy weight. On the other hand, another refrigeration apparatus that can achieve cooling down to an extremely low temperature has been conventionally known (for example, JPH8-68567A). Such a refrigeration apparatus circulates, by one compressor, a mixed refrigerant which includes two kinds of refrigerants having boiling points different from each other, so as to utilize differences between boiling points (evaporation temperatures) and condensation points (condensation temperatures) of the different refrigerants in order to realize chilling at extremely low temperature.

In the above refrigeration apparatus using one compressor, a part of a gas-phase refrigerant compressed by the compressor is condensed by a condenser, the mixed refrigerant is then separated into a first fluid portion that remains in a gas phase, and a liquid-phase second fluid portion which has been condensed by the condenser. Then, the liquid-phase second fluid portion is expanded into a gas-liquid mixed phase of a low temperature. After that, the gas-phase first fluid portion is condensed by the second fluid portion in a gas-liquid mixed phase, and the thus condensed first fluid portion is expanded to have a low temperature, so that cooling down to an extremely low temperature can be realized. Such a refrigeration apparatus is more advantageous than a dual refrigeration apparatus in terms of reduction in size, because it uses only one compressor.

In the refrigeration apparatus using one compressor as described above, the mixed refrigerant is separated into the gas-phase first fluid portion and the liquid-phase second fluid portion. In this case, ideally, all the lower-boiling-point refrigerant of the two kinds of refrigerants included in the mixed refrigerant becomes the first fluid portion in a gas phase, and all the higher-boiling-point refrigerant of the two kinds of refrigerants becomes the second fluid portion in a liquid phase. Namely, it is ideal that the mixed refrigerant is completely separated into the lower-boiling-point refrigerant in a gas phase, and the higher-boiling-point refrigerant in a liquid phase. This is because, when the first fluid portion in a gas phase, which has been subjected to the gas-liquid separation, includes the lower-boiling-point refrigerant and the higher-boiling-point refrigerant, a temperature of the first fluid portion, which is condensed and expanded up to a certain pressure, cannot be lower than that of a case in which a temperature of a liquid-phase fluid including only the lower-boiling-point refrigerant is expanded up to the same pressure.

However, in the conventional refrigeration apparatus of this type, the gas-phase first fluid portion, which has been subjected to the gas-liquid separation, practically includes both the lower-boiling-point refrigerant and the higher-boiling-point refrigerant. Thus, it is hard to say to exploit a refrigeration capacity that can be output by the lower-boiling-point refrigerant to a maximum extent.

SUMMARY OF THE INVENTION

The present invention has been made in consideration of the above circumstances. The object of the present invention is to provide a refrigeration apparatus and a temperature control system that can realize cooling down to an extremely low temperature level by separating, into a gas and a liquid, a mixed refrigerant including two kinds of refrigerants having boiling points different from each other. At this time, by exploiting a refrigeration capacity that can be output by a lower-boiling-point refrigerant of the two kinds of refrigerants included in the mixed refrigerant as much as possible, a liquid can be cooled down to a temperature lower than a conventional one.

A refrigeration apparatus according to the present invention comprises a refrigerant circuit having: a compressor that compresses a mixed refrigerant in a gas phase including a first refrigerant and a second refrigerant having a boiling point higher than that of the first refrigerant; a first condenser that cools the mixed refrigerant which has been compressed by the compressor so as to condense a part of the mixed refrigerant into a liquid phase; a first gas-liquid separator that separates the mixed refrigerant in a gas-liquid mixed phase which has passed through the first condenser, into a first fluid portion in a gas phase and a second fluid portion in a liquid phase which has been condensed by the first condenser; a second condenser for condensing a part of the first fluid portion which has been separated by the first gas-liquid separator; a second gas-liquid separator that separates the first fluid portion in a gas-liquid mixed phase which has passed through the second condenser, into a third fluid portion in a gas phase and a fourth fluid portion in a liquid phase which has been condensed by the second condenser; a third condenser for condensing the third fluid portion which has been separated by the second gas-liquid separator; a first expansion valve that expands the third fluid portion which has been condensed by the third condenser; and an evaporator for evaporating the third fluid portion which has been expanded by the first expansion valve, and allowing it to flow toward the compressor.

In the refrigeration apparatus according to the present invention, a part of the gas-phase mixed refrigerant, which has been compressed by the compressor, is condensed by the first condenser. Then, the mixed refrigerant in a gas-liquid mixed phase is separated into the gas-phase mixed refrigerant (first fluid portion) and the liquid-phase mixed refrigerant (second fluid portion) which has been condensed into a liquid phase (first gas liquid separation). Thereafter, a part of the gas-phase mixed refrigerant (first fluid portion), which has been subjected to the gas-liquid separation, is further condensed by the second condenser, and is then further separated into a gas and a liquid (second gas-liquid separation).

During the condensation by the second condenser, in the gas-phase mixed refrigerant (first fluid portion), the second refrigerant having a higher boiling point (in other words, having a higher condensation temperature) condenses before the first refrigerant having a lower boiling point (in other words, having a lower condensation temperature. Thus, when the mixed refrigerant which have passed through the second condenser is separated into the gas-phase mixed refrigerant (third fluid portion) and the liquid-phase mixed refrigerant (fourth fluid portion) which has been condensed into a liquid phase, the gas-phase mixed refrigerant (third fluid portion) having a higher concentration of the first refrigerant can be extracted, and the mixed refrigerant (third fluid portion) having a higher concentration of the first refrigerant can be allowed to flow into the third condenser. As a result, the gas-phase mixed refrigerant, which has a higher concentration of the first refrigerant than a concentration thereof upon the first gas-liquid separation, can be condensed by the third condenser, and then expanded. Therefore, the mixed refrigerant to be supplied to the evaporator can have a lower temperature as compared with that of a case in which the gas-phase mixed refrigerant, which has been subjected only to the first gas-liquid separation, is condensed and then expanded.

In this way, according to this embodiment, by exploiting a refrigeration capacity that can be output by the lower-boiling-point refrigerant (first refrigerant) of the two kinds of refrigerants included in the mixed refrigerant, a liquid can be cooled down to a temperature lower than a conventional one.

The refrigeration apparatus according to the present invention may comprise a first branch channel that is connected to the third condenser in order to supply the third condenser with the second fluid portion which has been separated by the first gas-liquid separator, and is connected to a part of the refrigerant circuit, which part is on the downstream side of the evaporator and on the upstream side of the compressor, in order to return, to the refrigerant circuit, the second fluid portion which has flown out from the third condenser, wherein: the first branch channel has a second expansion valve that expands the second fluid portion which has been separated by the first gas-liquid separator, and allows it to flow toward the third condenser; and the third condenser is configured to condense the third fluid portion in a gas phase which has been separated by the second gas-liquid separator, by the second fluid portion which has been expanded by the second evaporation valve.

Thus, complication of the system structure can be avoided.

The refrigeration apparatus according to the present invention may further comprise a second branch channel that is connected to the second condenser in order to supply the second condenser with the second fluid portion which has been separated by the first gas-liquid separator, and is connected to a part of the refrigerant circuit, which part is on the downstream side of the evaporator and on the upstream side of the compressor, in order to return, to the refrigerant circuit, the second fluid portion which has flown out from the second condenser is return, wherein the second condenser is configured to condense a part of the first fluid portion by the second fluid portion which has been supplied thereto from the second branch channel.

In this case, a part of the gas-phase first fluid portion, which has been separated by the first gas-liquid separator, can be condensed by utilizing a part of the mixed refrigerant. Thus, as compared with a case in which the part of the first fluid portion is cooled by other cooling means, the system structure can be simplified.

The second branch channel may have a third expansion valve that expands the second fluid portion which has been separated by the first gas-liquid separator, and allows it to flow toward the second condenser; and the second condenser may be configured to condense a part of the first fluid portion by the second fluid portion which has been expanded by the third expansion valve.

In this case, since the second fluid portion is expanded by the third expansion valve so as to have a low temperature, a part of the first fluid portion can be reliably condensed. Herein, the third expansion valve is preferably a valve whose opening degree can be regulated, in particular, an electronic expansion valve whose opening decree can be regulated. In this case, the higher-boiling-point refrigerant as the second refrigerant included in the first fluid portion can be reliably condensed, and the condensation of the first refrigerant can be suppressed. Thus, it can be prevented that an valve of the first refrigerant into the evaporator undesirably lowers.

In addition, the refrigeration apparatus according to the present invention may comprise a return channel for returning the fourth fluid portion in a liquid phase which has been separated by the second gas-liquid separator, to a part of the refrigerant circuit, which part is on the downstream side of the evaporator and on the upstream side of the compressor, wherein the return channel is provided with a flowrate regulation valve for regulating an amount of the fourth fluid portion to be returned to the refrigerant circuit.

In this case, since the flowrate regulation vale narrows the return channel, which connects the second gas-liquid separator where the high pressure mixed refrigerant is present, and the upstream side of the compressor where the low pressure mixed refrigerant is present, the gas-phase third fluid portion of the mixed refrigerant in the second gas-liquid separator can be prevented from flowing to the upstream side of the compressor, whereby a desired amount of the gas-phase third fluid portion can be allowed to flow into the third condenser. In addition, at this time, by regulating a return amount of the liquid-phase fourth fluid portion by means of the flowrate regulation valve, a concentration of the first refrigerant in the first fluid portion flowing into the third condenser can be regulated. Thus, the refrigeration capacity can be regulated by regulating the opening degree of the flowrate regulation valve.

In addition, the refrigeration apparatus according to the present invention may further comprise a return channel for returning the fourth fluid portion in a liquid phase which has been separated by the second gas-liquid separator, to a part of the refrigerant circuit, which part is on the downstream side of the evaporator and on the upstream side of the compressor, wherein: the return channel is provided with a flowrate regulation valve for regulating an amount of the fourth fluid portion to be returned to the refrigerant circuit; an accumulator is provided on a part of the refrigerant circuit, which part is on the downstream side of the evaporator and on the upstream side of the compressor; the first branch channel is configured to return the second fluid portion which has flown out from the third condenser, to the refrigerant circuit on the upstream side of the accumulator;

the second branch channel is configured to return the second fluid portion which has flown out from the second condenser, to the refrigerant circuit on the upstream side of the accumulator; and the return channel is configured to return the fourth fluid portion which has been separated by the second gas-liquid separator, to the refrigerant circuit on the upstream side of the accumulator.

In this case, even when the first branch channel, the second branch channel and the return channel return the liquid-phase refrigerant to the upstream side of the compressor, since the accumulator separates the liquid-phase refrigerant from the mixed refrigerant, liquid back into the compressor can be prevented. Since the second expansion valve, the third expansion valve and the flowrate regulation valve in the return channel can be utilized without consideration of the liquid back, desired cooling can be carried out under various conditions.

In addition, the first refrigerant may be R23 and the second refrigerant may be R134a.

In this case, a large condensation temperature difference between the first refrigerant and the second refrigerant can be ensured. Thus, the first condenser can condense most of the second refrigerant. In addition, the first gas-liquid separator can separate the mixed refrigerant into the gas-phase first fluid portion including quite a lot of first refrigerant, and the liquid-phase second fluid portion including quite a lot of second refrigerant. As a result, since a concentration of the first refrigerant in the mixed refrigerant, which finally flows into the evaporator, can be reliably increased, almost ideal cooling, in other words, cooling carried out by almost only the first refrigerant is enabled. An unmixed R23 can become lower than −80° C. under a presser of 0.114 Mpa (abs), for example, whereby cooling down to an extremely low temperature can be realized.

In addition, a liquid temperature control system according to the present invention comprises the aforementioned refrigeration apparatus, and a liquid supply circuit that allows a liquid to be cooled by the aforementioned refrigeration apparatus to flow therethrough.

The present invention can realize cooling down to an extremely low temperature level by separating, into a gas and a liquid, a mixed refrigerant including two kinds of refrigerants having boiling points different from each other. At this time, by exploiting a refrigeration capacity that can be output by the lower-boiling-point refrigerant of the two kinds of refrigerants included in the mixed refrigerant as much as possible, a liquid can be cooled down to a temperature lower than a conventional one.

BRIEF DESCRIPTION OF THE DRAWINGS

FIG. 1 is a schematic view of a liquid temperature control system comprising a refrigeration apparatus according to an embodiment of the present invention.

DETAILED DESCRIPTION OF THE INVENTION

An embodiment of the present invention is described in detail below with reference to the accompanying drawing.

FIG. 1 is a schematic view of a liquid temperature control system 1 according to an embodiment of the present invention. As shown in FIG. 1, the liquid temperature control system comprises a refrigeration apparatus 10, a liquid supply circuit 100 and a control device 200.

The refrigeration apparatus 10 is a refrigeration apparatus of a heat pump type, and is provided for cooling a liquid such as a brine circulated by the liquid supply circuit 100. The liquid supply circuit 100 allows a liquid to flow therethrough by driving a pump 111, heats the liquid cooled by the refrigeration apparatus 10 by means of a heater 112, and then supplies the liquid to a load 150 that is an object whose temperature is to be controlled (temperature control object). In the liquid supply circuit 100, the liquid having passed through the load 150 returns to the pump 111, and then the liquid is cooled and/or heated by the refrigeration apparatus 10 and/or the heater 112 so as to be supplied again to the load 150.

The refrigeration apparatus 10 comprises a refrigerant circuit 12 formed like a loop, and a first branch channel 13 and a second branch channel 14 that are branched from the refrigerant circuit 12 and are connected again to the refrigerant circuit 12.

The refrigerant circuit 12 has: a compressor 20 that compresses a mixed refrigerant in a gas phase including a first refrigerant and a second refrigerant having a boiling point (evaporation temperature) higher than that of the first refrigerant; a first condenser 21 that cools the mixed refrigerant which has been compressed by the compressor 20 so as to condense a part of the mixed refrigerant into a liquid phase; a first gas-liquid separator 22 that separates the mixed refrigerant in a gas-liquid mixed phase which has passed through the first condenser 21, into a first fluid portion in a gas phase and a second fluid portion in a liquid phase which has been condensed by the first condenser 21; a second condenser 23 for condensing a part of the first portion which has been separated by the first gas-liquid separator 22; a second gas-liquid separator 24 that separates the first fluid portion in a gas-liquid mixed phase which has passed through the second condenser 23, into a third fluid portion in a gas phase and a fourth fluid portion in a liquid phase which has been condensed by the second condenser 23; a third condenser 25 for condensing the third fluid portion which has been separated by the second gas-liquid separator 24; a first expansion valve 26 that expands the third fluid portion which has been condensed by the third condenser 25; and an evaporator for evaporating the third fluid portion which has been expanded by the first expansion valve 26, and allowing it to flow toward the compressor 20.

To put it strictly, the refrigerant circuit 12 is formed by connecting the above-described constituent members by pipes in a loop shape matter. In addition, in the mixed refrigerant, a boiling point (evaporation temperature) of the second refrigerant is higher than a boiling point (evaporation temperature) of the first refrigerant, and a condensation point (condensation temperature) of the second refrigerant is also higher than a condensation point (condensation temperature) of the first refrigerant. In FIG. 1, for the sake of convenience in description, the gas-phase first fluid portion and the liquid-phase second fluid portion, which are separated by the first gas-liquid separator 22, are indicated by marks I and II, respectively. Similarly, the gas-phase third fluid portion and the liquid-phase fourth portion, which are separated by the second gas-liquid separator 24, are indicated by marks III and IV, respectively.

The compressor 20 compresses the gasified mixed refrigerant having a lower pressure, which has flown out from the evaporator 27, into a gas-phase refrigerant having a high temperature and a high pressure, and discharges it. By way of example, the compressor 20 is a scroll-type compressor, but a compressor of another type may be used.

In the mixed refrigerant in this embodiment, the first refrigerant is R23 and the second refrigerant is R134a. Although it is ideally desired that the first condenser 21 condenses the second refrigerant (R134a) into a completely liquid phase, while remaining the first refrigerant (R23) in a completely gas phase, the liquid-phase portion condensed by the first condenser 21 practically includes the first refrigerant and the second refrigerant, and the gas-phase portion that is not condensed also includes the first refrigerant and the second refrigerant. However, when R23 is used as the first refrigerant and R134a is used as the second refrigerant, a large condensation temperature difference between the first refrigerant and the second refrigerant can be ensured. Thus, the first condenser 21 can condense most of the second refrigerant as R134a by cooling the mixed refrigerant. Thus, following thereto, the first gas-liquid separator 22 can separate the mixed refrigerant into the gas-phase first fluid portion including quite a lot of first refrigerant, and the liquid-phase second fluid portion including quite a lot of second refrigerant.

Note that the mixed refrigerant is not limited to the combination of the refrigerants in this embodiment, and may be formed by combining other refrigerants. For example, as the mixed refrigerant, a combination of R116 as the first refrigerant and R134a as the second refrigerant, a combination of R23 as the first refrigerant and R152a as the second refrigerant, and so on can be employed. These combinations can also ensure a large condensation temperature difference.

The first condenser 21 in this embodiment has a condenser body 21A that allows the mixed refrigerant to flow therethrough, and a plurality of fans 21B serving as a cooling unit that cools the mixed refrigerant flowing through the condenser body 21A. In this embodiment, a quantity of airflow of the fans 21B is controlled by the control device 200. Since R134a, which is the second refrigerant to be condensed by the first condenser 21, has a relatively high condensation temperature, R134a can be condensed by air cooling. However, when the second refrigerant is a refrigerant having a condensation temperature lower than that of R134a so that it may be difficult to condense it by air cooling, a brine circuit that can ensure a higher cooling capacity (refrigeration power) may be used as the cooling unit, instead of the fans 21B.

The first gas-liquid separator 22 receives, through an inlet port 22A, the mixed fluid from the first condenser 21, and then separates it into the first fluid portion (I) and the second fluid portion (II) as described above. Thereafter, the first gas-liquid separator 22 discharges the gas-phase first fluid portion (I) from a gas outlet port 22B, and discharges the liquid-phase second fluid portion (II) from a liquid outlet port 22C.

The second condenser 23 is provided for condensing a part of the first fluid portion (I) discharged from the above-described gas outlet port 22B, and is configured to allow the first fluid portion (I) to flow therethrough, and to allow a cooling medium for cooling the first fluid portion (I) to flow therethrough. The second condenser 23 is configured to condense a part of the first fluid portion (I) by heat-exchanging the first fluid portion (I) and the cooling medium. In this embodiment, the second fluid portion (II) is used as the cooling medium for cooling the first fluid portion (I). The second fluid portion (II) flows into the second condenser 23 through the above-described second branch channel 14, which will be described in detail below. In this embodiment, although the second condenser 23 is formed by a plate-type heat exchanger, it may be formed by a shell and tube-type heat exchanger or the like.

The second gas-liquid separator 24 is configured to receive, through an inlet port 24A, the mixed refrigerant in a gas-liquid mixed phase from the second condenser 23, and then to separate it into the third fluid portion (III) and the fourth fluid portion (IV) as described above. Thereafter, the second gas-liquid separator 24 discharges the gas-phase fluid portion (III) from a gas outlet port 24B, and discharges the liquid-phase fluid portion (IV) from a liquid outlet port 24C.

The second condenser 25 is provided for condensing the third fluid portion (III) discharged from the gas outlet port 24B of the above-described second gas-liquid separator 24, and is configured to allow the third fluid portion (III) to flow therethrough, and to allow the second fluid portion (II) for cooling the third fluid portion (III) to flow therethrough. Namely, the third condenser 25 is configured to condense the third fluid portion (III), ideally all the third fluid portion (III), by heat-exchanging the third fluid portion (III) and the second fluid portion (II). The second fluid portion (II) flows into the third condenser 25 through the above-described first branch channel 13, which will be described in detail below. In this embodiment, although the third condenser 25 is also formed by a plate-type heat exchanger, it may be formed by a shell and tube-type heat exchanger or the like.

The first expansion valve 26 is provided for expanding the liquid-phase third fluid portion (III) condensed by the third condenser 25 into a gas-liquid mixed phase. The first expansion valve 26 in this embodiment is an electronic expansion valve whose opening degree can be regulated. Its opening degree is regulated by the control device 200.

The evaporator 27 is connected to the liquid supply circuit 100 in order to allow a liquid of the liquid supply circuit 100 to flow therethrough, and is configured to allow the first fluid portion (III) flowing out from the first expansion valve 26 to flow therethrough, so as to cool the liquid of the liquid supply circuit 100 and so as to evaporate the third fluid portion (III) in a gas-liquid mixed phase, by heat-exchanging the third fluid portion (III) and the liquid of the liquid supply circuit 100. In this embodiment, although the evaporator 27 is also formed by a plate-type heat exchanger, it may be formed by a shell and tube-type heat exchanger or the like. Also in this embodiment, since the liquid of the liquid supply circuit 100 is cooled by the refrigeration apparatus 10, a heat exchanger capable of allowing two kinds of fluids to flow therethrough is employed as the evaporator. However, in a case where a gas such as outside air is cooled by the refrigeration apparatus 10, the evaporator 27 may be a fin tube-type evaporator or the like.

The refrigerant circuit 12 in this embodiment is further provided with an accumulator 28 on the downstream side of the evaporator 27 and on the upstream side of the compressor 20. When the mixed refrigerant includes a liquid-phase portion, the accumulator 28 separates the liquid-phase portion therefrom so as to prevent liquid back to the compressor 20.

Next, the first branch channel 13 is described. The first branch channel 13 in this embodiment is connected to the third condenser 25 in order to supply the third condenser 25 with the second fluid portion (II) which has been separated by the first gas-liquid separator 22, and is configured to return, to the refrigerant circuit 25, the second fluid portion (II) which has flown out from the third condenser 25. To be specific, the first branch channel 13 extends from the liquid outlet port 22C of the first gas-liquid separator 22 so as to be connected to the third condenser 25, and is then connected to a part of the refrigerant circuit 12, which part is on the downstream side of the evaporator 27 and on the upstream side of the compressor 20. The first branch channel 13 has an inlet side end 13A connected to the liquid outlet port 22C of the first gas-liquid evaporator 22, and an outlet side end 13B connected to a part of the refrigerant circuit 12, which part is on the downstream side of the evaporator 27 and on the upstream side of the compressor 20. The outlet side end 13B is connected to the upstream side of the accumulator 28.

In more detail, the first branch channel 13 has an upstream part 13U positioned on the upstream side with respect to the third condenser 25, and a downstream part 13D positioned on the downstream side with respect to the third condenser 25. The upstream part 13U is connected to an inlet port of one channel of channels for two kinds of fluids provided on the third condenser 25. The downstream part 13D is connected to an outlet port of the one channel. A pipe constituting the refrigerant circuit 12 is connected to an inlet port and an outlet port of the other channel of the channels for two kinds of fluids.

The first branch channel 13 is provided with a second expansion valve 30 that expands the liquid-phase second fluid portion (II) which has been separated by the first gas-liquid separator 22, and allows it to flow toward the third condenser 25. The second expansion valve 30 expands the liquid-phase second fluid portion (II) into a gas-liquid mixed phase having a low pressure and a low temperature, and supplies it to the third condenser 25. Thus, the third condenser 25 can condense the third fluid portion (III) by the second fluid portion (II). The second expansion valve 30 in this embodiment is an electronic expansion valve whose opening degree can be regulated. Its opening degree is regulated by the control device 200.

In order to condense the liquid-phase third fluid portion (III) by the second fluid portion (II) in the third condenser 25, it is necessary that a temperature of the second fluid portion (II), which has been expanded by the second expansion valve 30, is lower than a condensation temperature of the third fluid portion (III). In this embodiment, R23 and R134a which have therebetween a large boiling point difference are used as the first refrigerant and the second refrigerant, respectively. Thus, when the liquid-phase second fluid portion (II) predominantly including the second refrigerant is expanded, the temperature of the second fluid portion (II) can be easily lowered to a degree sufficient to condense the gas-phase third fluid portion (III) predominantly including the first refrigerant.

Next, the second branch channel 14 is descried. The second branch channel 14 in this embodiment is connected to the second condenser 23 in order to supply the second condenser 23 with the second fluid portion (II) which has been separated by the first gas-liquid separator 22, and is configured to return, to the refrigerant circuit 25, the second fluid portion (II) which has flown out from the second condenser 23. To be specific, the second branch channel 14 extends from a part of the first branch channel 13, which part is between the first gas-liquid separator 22 and the second expansion valve 30, so as to be connected to the second condenser 23, and is then connected to a part of the refrigerant circuit 12, which part is on the downstream side of the evaporator 27 and on the compressor 20. The second branch channel 14 has an inlet side end 14A connected to the first branch channel 13, and an outlet side end 14B connected to a part of the refrigerant circuit 12, which part is on the downstream side of the evaporator 27 and on the upstream side of the compressor 20. The outlet side end 14B is connected to the upstream side of the accumulator 28.

In more detail, the second branch channel 14 has an upstream part 14U positioned on the upstream side with respect to the second condenser 23, and a downstream part 14U positioned on the downstream side with respect to the second condenser 23. The upstream part 14U is connected to an inlet port of one channel of channels for two kinds of fluids provided on the second condenser 23. The downstream part 14D is connected to an outlet port of the one channel. A pipe constituting the refrigerant circuit 12 is connected to an inlet port and an outlet port of the other channel of the channels for two kinds of fluids.

Since the second branch channel 14 is connected to the second condenser 23 as described above, the second condenser 23 can condense a part of the first fluid (I) by the second fluid portion (II) supplied from the second branch channel 14. In more detail, the second branch channel 14 in this embodiment is provided with a third expansion valve 31 that expands the liquid-phase second fluid portion (II), which has been separated by the first gas-liquid separator 22, and allows it to flow toward the second condenser 23. The third expansion valve 31 expands the liquid-phase second fluid portion (II) to lower its temperature, and supplies the second fluid portion (II) to the second condenser 23. Thus, the second condenser 23 reliably can condense a part of the first fluid portion (I) by the second fluid portion (II). The third expansion valve 31 in this embodiment is an electronic expansion valve whose opening degree can be regulated. Its opening degree is regulated by the control device 200.

When condensing a part of the liquid-phase first fluid portion (I) by the second fluid portion (II), the second condenser 23 in this embodiment is configured to mainly condense the second refrigerant included in the first fluid portion (I) and to suppress the condensation of the first refrigerant included in the first fluid portion (I) as much as possible. In order to carry out such a condensation, the refrigeration capacity of the second condenser 23 may be regulated by regulating a pressure of the expanded second fluid portion (II) and/or a flow-rate of the mixed refrigerant into the second condenser 23 by means of the third expansion valve 31. Since such a refrigeration capacity depends on a mixture ratio of the first refrigerant and the second refrigerant, the refrigeration capacity may be suitably regulated in accordance with the mixed refrigerant to be used.

In addition, in this embodiment, the second gas-liquid separator 24 is connected with a return channel 15 for returning the liquid-phase fourth fluid portion (IV), which has been separated by the second gas-liquid separator 24, to a part of the refrigerant circuit 12, which part is on the downstream side of the evaporator 27 and on the upstream side of the compressor 20. The return channel 15 in this embodiment has one end thereof connected to the liquid outlet port 24C of the second gas-liquid separator 24, and the other end thereof connected to the downstream part 14D of the second branch channel 14. Thus, the return channel 15 is configured to return the fourth fluid portion (IV), which has been separated by the second gas-liquid separator 24, to the refrigerant circuit 12 on the upstream side of the accumulator 28.

In addition, the return channel 15 is provided with a flowrate regulation valve 15A for regulating an amount of the fourth fluid portion (IV) to be returned to the refrigerant circuit 12. In this embodiment, since the flowrate regulation vale 15A narrows the return channel 15, which connects the second gas-liquid separator 24 where the high pressure mixed refrigerant is present, and the upstream side of the compressor 20 where the low pressure mixed refrigerant is present, the gas-phase third fluid portion (III) of the mixed refrigerant in the second gas-liquid separator 24 can be prevented from flowing to the upstream side of the compressor 20, whereby a desired amount of the gas-phase third fluid portion (III) can be allowed to flow into the third condenser 25.

In addition, the refrigeration apparatus 10 in this embodiment further comprises an injection channel 16 that extends from a part of the first branch channel 13, which part is between the first gas-liquid separator 22 and the second expansion valve 30, so as to be connected to the compressor 20. The injection channel 16 has an on-off valve 16A that switches flow of the second fluid portion (II), which has been separated by the first gas-liquid separator 22, toward the compressor 20, and shut-off thereof, and a capillary tube 16B provided on the downstream side of the on-off valve 16A so as to allow the second fluid portion (II) from the on-off valve 16A to flow therethrough.

In the injection channel 16, when the on-off valve 16A is opened, the liquid-phase second fluid portion (II) flowing into the capillary tube 16B is expanded to lower its temperature. The liquid-phase second fluid portion (II) having a lower temperature flows into the compressor 20. Thus, increase in temperature of the compressor 20 an be suppressed. The on-off valve 16A is formed of, e.g., a solenoid valve, and is configured to be controlled by the control device 200.

Next, the control device 200 is described. The control device 200 in this embodiment is electrically connected to the first expansion valve 26, the second expansion valve 30, the third expansion valve 31, the flowrate regulation valve 15A, the fans 21B and the on-off valve 16A. The control device 200 can control these members.

Next, an operation of the liquid temperature control system 1 according to this embodiment is described.

Upon start of a temperature control operation by the liquid temperature control system 1, the compressor 20 of the refrigeration apparatus 10 is firstly driven, and the pump 11 of the liquid supply circuit 100 is driven. Thus, the mixed refrigerant is circulated in the refrigeration apparatus 10, and the liquid is circulated in the liquid supply circuit 100.

When the compressor 20 is driven as described above, a part of the gas-phase mixed refrigerant, which has been compressed by the compressor 20, is firstly condensed by the first condenser 21. Then, the mixed refrigerant which is now in a gas-liquid mixed phase is separated into the gas-phase mixed refrigerant (first fluid portion (I)) and the liquid-phase mixed refrigerant (second fluid portion (II)) which has been condensed into a liquid phase (first gas-liquid separation). Thereafter, a part of the gas-phase mixed refrigerant (first fluid portion (I)), which has been subjected to the gas-liquid separation, is further condensed by the second condenser 23, and is then further separated by the second gas-liquid separator 24 into the gas-phase mixed refrigerant (third fluid portion (III)) and the liquid-phase refrigerant (fourth fluid portion (IV)) which has been condensed into a liquid phase (second gas-liquid separation).

During the condensation by the second condenser 23, in the gas-phase mixed refrigerant (first fluid portion (I)), the second refrigerant having a higher boiling point (in other words, having a higher condensation temperature) condenses before the first refrigerant having a lower boiling point (in other words, having a lower condensation temperature) condenses. Thus, when the mixed refrigerant which have passed through the second condenser 23 is separated into the gas-phase mixed refrigerant (third fluid portion (III)) and the liquid-phase mixed refrigerant (fourth fluid portion (IV)) which has been condensed into a liquid phase, the gas-phase refrigerant (third fluid portion (III)) having a higher concentration of the first refrigerant can be extracted, and the mixed refrigerant having a higher concentration of the first refrigerant can be allowed to flow into the third condenser 25. As a result, the gas-phase mixed refrigerant, which has a higher concentration of first refrigerant than a concentration thereof upon the first gas-liquid separation, can be condensed by the third condenser 25 and then expanded. Therefore, the mixed refrigerant to be supplied to the evaporator 27 can have a lower temperature as compared with a case in which the gas-phase mixed refrigerant, which has been subjected only to the first gas-liquid separation, is condensed and then expanded.

In this way, according to this embodiment, by exploiting a refrigeration capacity that can be output by the lower-boiling-point refrigerant (first refrigerant) of the two kinds of refrigerants included in the mixed refrigerant as much as possible, a liquid can be cooled down to a temperature lower than a conventional one.

The present invention is not limited to the above-described embodiment, and can be variously modified. For example, in the above-described embodiment, the second condenser 23 and the third condenser 25 cool the first fluid portion (I) or the third fluid portion (III) by the liquid second fluid portion (II) which has been separated by the first gas-liquid separator 22 into a gas and a liquid. In place of this embodiment, the second condenser 23 and the third condenser 25 may be supplied with a fluid for cooling the first fluid (I) or the third fluid portion (III) by another system.

1 Liquid temperature control system
10 Refrigeration apparatus
12 Refrigerant circuit
13 First branch channel
13A Inlet side end
13B Outlet side end
13U Upstream part
13D Downstream part
14 Second branch channel
14A Inlet side end
14B Outlet side end
14U Upstream part
15 Return channel
15A Flowrate regulation valve
16 Injection channel
20 Compressor
21 First condenser
21A Condenser body
21B Fan
22 First gas-liquid separator
22A Inlet port
22B Gas outlet port
22C Liquid outlet port
23 Second condenser
24 Second gas-liquid separator
24A Inlet port
24B Gas outlet port
24C Liquid outlet port
25 Third condenser
26 First expansion valve
27 Evaporator
28 Accumulator
30 Second expansion valve
31 Third expansion valve
100 Liquid supply circuit
111 Pump
112 Heater
150 Load
200 Control device

What is claimed is:

1. A refrigeration apparatus comprising a refrigerant circuit having: a compressor that compresses a mixed refrigerant in a gas phase including a first refrigerant and a second refrigerant having a boiling point higher than that of the first refrigerant; a first condenser that cools the mixed refrigerant which has been compressed by the compressor so as to condense a part of the mixed refrigerant into a liquid phase; a first gas-liquid separator that separates the mixed refrigerant in a gas-liquid mixed phase which has passed through the first condenser, into a first fluid portion in a gas phase and a second fluid portion in a liquid phase which has been condensed by the first condenser; a second condenser for condensing a part of the first fluid portion which has been separated by the first gas-liquid separator; a second gas-liquid separator that separates the first fluid portion in a gas-liquid mixed phase which has passed through the second condenser, into a third fluid portion in a gas phase and a fourth fluid portion in a liquid phase which has been condensed by the second condenser; a third condenser for condensing the third fluid portion which has been separated by the second gas-liquid separator; a first expansion valve that expands the third fluid portion which has been condensed by the third condenser; and an evaporator for evaporating the third fluid portion which has been expanded by the first expansion valve, and allowing it to flow toward the compressor, and the refrigeration apparatus further comprising a first branch channel that is connected to the third condenser in order to supply the third condenser with the second fluid portion which has been separated by the first gas-liquid separator, and is connected to a part of the refrigerant circuit, which part is on the downstream side of the evaporator and on the upstream side of the compressor, in order to return, to the refrigerant circuit, the second fluid portion which has flown out from the third condenser, wherein:

the first branch channel has a second expansion valve that expands the second fluid portion which has been separated by the first gas-liquid separator, and allows it to flow toward the third condenser; and the third condenser is configured to condense the third fluid portion in a gas phase which has been separated by the second gas-liquid separator, by the second fluid portion which has been expanded by the second evaporation valve.

2. The refrigeration apparatus according to claim 1 further comprising a return channel for returning the fourth fluid portion in a liquid phase which has been separated by the second gas-liquid separator, to a part of the refrigerant circuit, which part is on the downstream side of the evaporator and on the upstream side of the compressor, wherein the return channel is provided with a flowrate regulation valve for regulating an amount of the fourth fluid portion to be returned to the refrigerant circuit.

3. The refrigeration apparatus according to claim 1, wherein the first refrigerant is R23 and the second refrigerant is R134a.

4. A liquid temperature control system comprising the refrigeration apparatus according to claim 1, and a liquid supply circuit that allows a liquid to be cooled by the refrigeration apparatus to flow therethrough.

5. The refrigeration apparatus according to claim 1 further comprising a second branch channel that is connected to the second condenser in order to supply the second condenser with the second fluid portion which has been separated by the first gas-liquid separator, and is connected to a part of the refrigerant circuit, which part is on the downstream side of the evaporator and on the upstream side of the compressor, in order to return, to the refrigerant circuit, the second fluid portion which has flown out from the second condenser, wherein the second condenser is configured to condense a part of the first fluid portion by the second fluid portion which has been supplied thereto from the second branch channel.

6. The refrigeration apparatus according to claim 5 further comprising a return channel for returning the fourth fluid portion in a liquid phase which has been separated by the second gas-liquid separator, to a part of the refrigerant circuit, which part is on the downstream side of the evaporator and on the upstream side of the compressor, wherein:

the return channel is provided with a flowrate regulation valve for regulating an amount of the fourth fluid portion to be returned to the refrigerant circuit;

an accumulator is provided on a part of the refrigerant circuit, which part is on the downstream side of the evaporator and on the upstream side of the compressor;

the first branch channel is configured to return the second fluid portion which has flown out from the third condenser, to the refrigerant circuit on the upstream side of the accumulator;

the second branch channel is configured to return the second fluid portion which has flown out from the second condenser, to the refrigerant circuit on the upstream side of the accumulator; and the return channel is configured to return the fourth fluid portion which has been separated by the second gas-liquid separator, to the refrigerant circuit on the upstream side of the accumulator.

7. The refrigeration apparatus according to claim 5, wherein:

the second branch channel has a third expansion valve that expands the second fluid portion which has been separated by the first gas-liquid separator, and allows it to flow toward the second condenser; and the second condenser is configured to condense a part of the first fluid portion by the second fluid portion which has been expanded by the third expansion valve.

8. The refrigeration apparatus according to claim 7 further comprising a return channel for returning the fourth fluid portion in a liquid phase which has been separated by the second gas-liquid separator, to a part of the refrigerant circuit, which part is on the downstream side of the evaporator and on the upstream side of the compressor, wherein:

the return channel is provided with a flowrate regulation valve for regulating an amount of the fourth fluid portion to be returned to the refrigerant circuit;

an accumulator is provided on a part of the refrigerant circuit, which part is on the downstream side of the evaporator and on the upstream side of the compressor;

the first branch channel is configured to return the second fluid portion which has flown out from the third condenser, to the refrigerant circuit on the upstream side of the accumulator;

the second branch channel is configured to return the second fluid portion which has flown out from the second condenser, to the refrigerant circuit on the upstream side of the accumulator; and the return channel is configured to return the fourth fluid portion which has been separated by the second gas-liquid separator, to the refrigerant circuit on the upstream side of the accumulator.

* * * * *